(12) United States Patent
Takahashi

(10) Patent No.: US 9,916,376 B2
(45) Date of Patent: Mar. 13, 2018

(54) DIGITAL DOCUMENT KEYWORD GENERATION

(71) Applicant: FUJITSU LIMITED, Kawasaki-shi, Kanagawa (JP)

(72) Inventor: Tetsuro Takahashi, Brookline, MA (US)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 14/823,885

(22) Filed: Aug. 11, 2015

(65) Prior Publication Data

US 2017/0046345 A1  Feb. 16, 2017

(51) Int. Cl.
*G06F 7/00* (2006.01)
*G06F 17/30* (2006.01)

(52) U.S. Cl.
CPC .... *G06F 17/30616* (2013.01); *G06F 17/3053* (2013.01)

(58) Field of Classification Search
CPC .................................................. G06F 17/3053
See application file for complete search history.

(56) References Cited

U.S. PATENT DOCUMENTS 8,606,795 B2  12/2013  Morgana et al.

FOREIGN PATENT DOCUMENTS

JP  2012-242966 A  12/2012

*Primary Examiner* — Ajith Jacob
(74) *Attorney, Agent, or Firm* — Maschoff Brennan

(57) ABSTRACT

According to an aspect of an embodiment, a method may include obtaining a wordlist from a digital document. The method may further include creating a keyword candidate list derived from the wordlist and noting the relationships between the keyword candidates. The method may also include obtaining scores for the keyword candidates. The method may further include selecting keyword candidates as keywords of the digital document based on the scores and the relationships between the keyword candidates.

20 Claims, 12 Drawing Sheets

*702* {the, new, public, beta, program, began, in, January}

*704* {The, program, has, been, a, success}

*706* {new, public, beta, program, began, January}

*708* {new, public, beta, program}

*710* {public, beta, program, began}

*712* {beta, program, began, January}

*714* {new, public!, beta, program!}

*716* {public!, beta, program!, beg*n}

*718* {beta, program!, beg*n, January}

| Keyword Candidates |
|---|
| public |
| public-beta |
| public-beta-program |
| public-beta-program-began |
| beta |
| beta-program |
| beta-program-began |
| program |
| program-began |
| began |

| ID | Keyword Candidates | ID Preceding | ID Following |
|---|---|---|---|
| 1 | public | null | 5, 6, 7 |
| 2 | public-beta | null | 8, 9 |
| 3 | public-beta-program | null | 10 |
| 4 | public-beta-program-began | null | null |
| 5 | beta | 1 | 8, 9 |
| 6 | beta-program | 1 | 10 |
| 7 | beta-program-began | 1 | null |
| 8 | program | 2, 5 | 10 |
| 9 | program-began | 2, 5 | null |
| 10 | began | 3, 6, 8 | null |

*Fig. 7B*

| ID | Keyword Candidates | Relevance Score |
|---|---|---|
| 1 | public | 0.25 |
| 2 | public-beta | 0.5 |
| 3 | public-beta-program | 1.0 |
| 4 | public-beta-program-began | 0.25 |
| 5 | beta | 1.0 |
| 6 | beta-program | 1.25 |
| 7 | beta-program-began | 0.5 |
| 8 | program | 1.0 |
| 9 | program-began | 1.25 |
| 10 | began | 2.0 |

*Fig. 7D*

| ID | Keyword Candidates | ID Preceding | ID Following | Relevance Score |
|---|---|---|---|---|
| 1 | public | null | 5, 6, 7 | 0.25 |
| 2 | public-beta | null | 8, 9 | 0.5 |
| 3 | public-beta-program | null | 10 | 1.0 |
| 4 | public-beta-program-began | null | null | 0.25 |
| 5 | beta | 1 | 8, 9 | 1.0 |
| 6 | beta-program | 1 | 10 | 1.25 |
| 7 | beta-program-began | 1 | null | 0.5 |
| 8 | program | 2, 5 | 10 | 1.0 |
| 9 | program-began | 2, 5 | null | 1.25 |
| 10 | began | 3, 6, 8 | null | 2.0 |

*Fig. 7E*

DIGITAL DOCUMENT KEYWORD GENERATION

FIELD

The embodiments discussed in the present disclosure are related to digital document keyword generation.

BACKGROUND

Due in part to the prevalence of computers and other digital devices, large numbers of digital documents exist and many more are being created daily. Determining the subject matter of the digital documents may help in finding, organizing, storing, summarizing, analyzing, or otherwise using the digital documents.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a wordlist from a digital document. The method may further include creating a keyword candidate list derived from the wordlist and noting the relationships between the keyword candidates. The method may also include obtaining scores for the keyword candidates. The method may further include selecting keyword candidates as keywords of the digital document based on the scores and the relationships between the keyword candidates.

The object and advantages of the embodiments will be realized and achieved at least by the elements, features and combinations particularly pointed out in the claims.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIG. 7A illustrates example wordlists and keyword candidates;

FIG. 7B illustrates an example table that indicates relative positions of keyword candidates;

FIG. 7D illustrates a table that indicates relevance scores of keyword candidates;

FIG. 7E illustrates a table that indicates relevant positions of keyword candidates and relevance scores of the keyword candidates.

DESCRIPTION OF EMBODIMENTS

Some embodiments described in the present disclosure relate to methods and systems of keyword generation with respect to a digital document ("document"). The keywords that may be generated may reflect subject matter of the document, which may help in finding, organizing, storing, summarizing, analyzing, or otherwise using the document. In some embodiments, the document may be parsed into one or more wordlists. The wordlists may be refactored to form keyword candidates. The keyword candidates may include single words from the wordlist, or groups of words from the wordlist. Keyword candidates may be scored based on their relevance to the document, and their prevalence in other documents. In some embodiments, one or more keyword candidates may be selected as keywords of the wordlist ("wordlist keywords") based on their respective scores. For example, a highest scoring keyword candidate may be selected as a wordlist keyword. Other keyword candidates may be selected based on their relevance scores and their positions in the wordlist relative to the highest scoring keyword candidate. The keywords of the document ("document keywords") may be selected from the wordlist keywords.

The processes of wordlist creation, keyword-candidate creation, relevance scoring, position relation, keyword-candidate selection and keyword selection will be described in further detail below. Embodiments of the present disclosure are explained with reference to the accompanying drawings.

Figure 1:
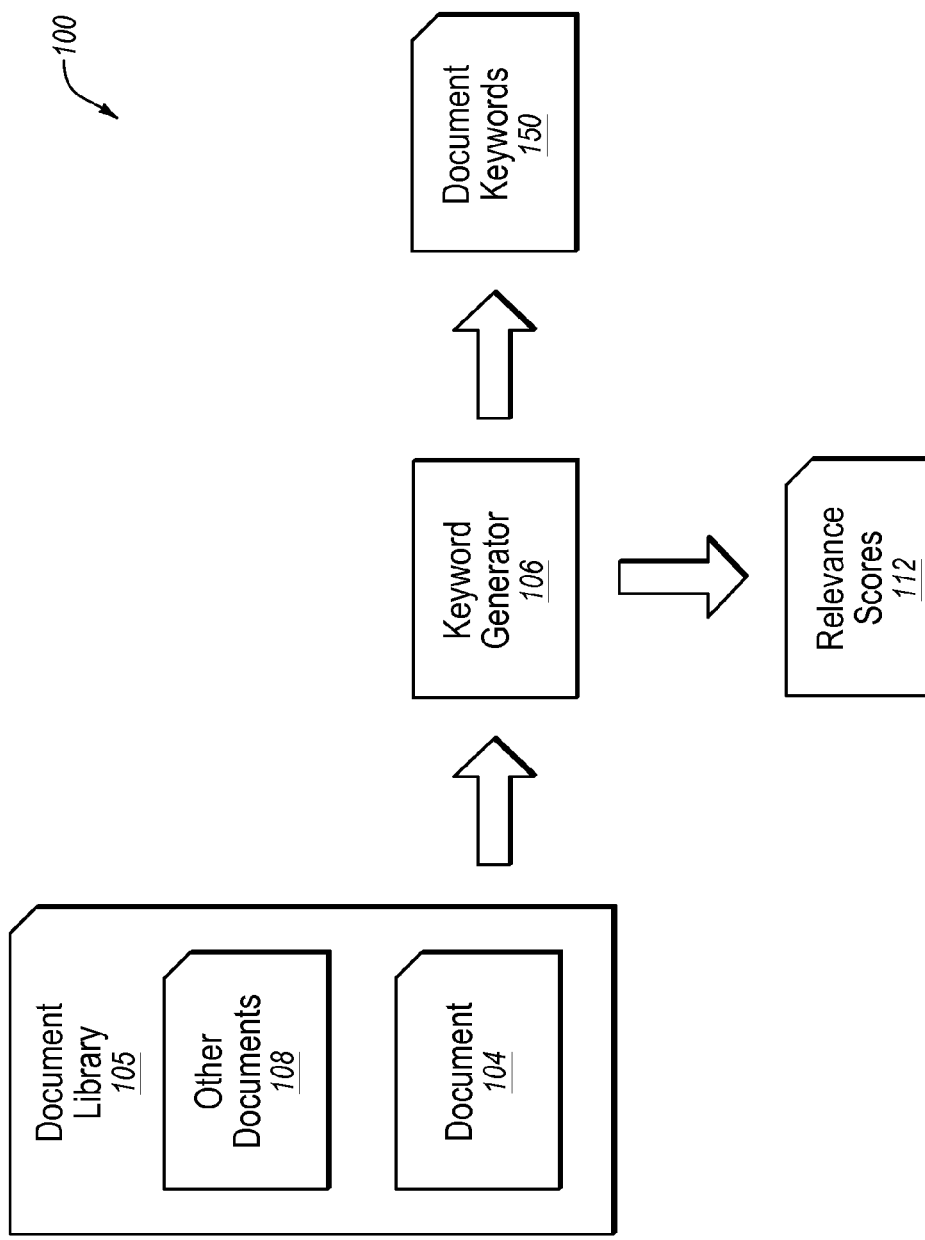
FIG. 1 is a diagram representing an example system configured to generate keywords of documents.

FIG. 1 is a diagram representing an example system 100 which may be configured to generate keywords for a digital document 104 ("document 104"), arranged in accordance with at least one embodiment described in the present disclosure. The system 100 may include a keyword generator 106 configured to perform keyword generation with respect to a document 104 of a document library 105 to generate document keywords 150 of the document 104. In these or other embodiments, the keyword generator 106 may use other digital documents 108 ("other documents 108") of the document library 105 to generate the document keywords 150. Additionally or alternatively, the keyword generator 106 may generate one or more relevance scores 112 that may be stored and may be used later.

The document library 105 may include a corpus of documents that may include the document 104 and the other documents 108. In some embodiments, one or more documents of the document library 105 (including the document 104 and/or the other documents 108) may be digital and may be in a searchable format. For example, the documents may include one or more file formats including: .txt, .doc, .docx, .pdf, .wpd, .html, .xml, .xls, or .xlsx. Additionally or alternatively, the documents may be from online or printed sources. For example, the documents may be from books, or periodicals such as magazines, newspapers, journals, etc. Further, the documents may be from online sources such as news sites, online encyclopedia sites, blogs, forums, social media, etc. The documents library 105 may include any number of documents and in some embodiments may include a large number of documents. For example, the document library 105 may include anywhere from hundreds to millions of documents.

Use of the term "document" in the present disclosure may refer to one or more documents or corresponding files that may have one or more operations performed therewith. For example, the document 104 may include multiple documents in that keywords that may indicate subject matter of the multiple documents as a whole may be determined according to present disclosure.

As detailed below the keyword generator 106 may be configured to perform a series of operations with respect to the document 104 to generate one or more document keywords 150 of the document 104. The document keywords 150 may include words or groups of words, or phrases that are relevant to or may reflect the subject matter of the document 104. For example, the document keywords 150 may relate to a subject of the document 104, or may include words that may appear one or more times in the document 104, or may include words that may appear rarely in the other documents 108 of the document library 105.

In some embodiments the document keywords 150 may be organized in an ordered list. Additionally or alternatively, the ordering of the document keywords 150 may reflect a ranking of the document keywords. For example, the document keywords 150 that are determined to be most relevant to the document 104 may be ordered first in the document keywords 150.

In some embodiments, the keyword generator 106 may be configured to parse words from the document 104 into one or more wordlists. For example, the keyword generator 106 may be configured to take words from a sentence in the document 104 to form a wordlist. Additionally or alternatively, the keyword generator 106 may be configured to take words from a paragraph in the document 104 to form a wordlist. In these or other embodiments, the keyword generator 106 may be configured to take words from the document 104 without regard to sentences or paragraphs to form a wordlist. The wordlists may each include multiple words from the document 104. In some embodiments, the wordlists, taken together, may include each word in the document 104. Additionally or alternatively, two or more of the wordlists may include one or more of the same words from the document 104.

In some embodiments the keyword generator 106 may be configured to select keywords from the wordlists. The process of selecting keywords from a wordlist may include refactoring a wordlist into keyword candidates. The keyword candidates may include words in the wordlist and combinations of words in the wordlist (e.g., combinations of words adjacent to each other in the wordlist). In some embodiments the keyword generator 106 may be configured to form keyword candidates that are limited to a particular number of composite words. ("keyword-length limit"). In some instances, a higher keyword-length limit may yield more accurate keywords, but may also use more processing resources. As such, selection of the keyword-length limit may be based on processing resource use and a target accuracy level.

In some embodiments, the process of selecting keywords from a wordlist may include the keyword generator 106 being configured to score keyword candidates based on a relevance scoring method to generate the relevance scores 112. The relevance scores 112 may include a representation of the relevance of words in the document 104. The relevance scores 112 may also include a representation of the relevance of words in the other documents 108. In some embodiments, the relevance scores 112 may be used later when generating keywords. The relevance scores 112 may be stored for future use.

In some embodiments, the scoring method may include scoring a keyword candidate based on a Term Frequency (TF) score that may indicate a frequency of a particular keyword candidate in the document 104. The scoring method may also include scoring a keyword candidate based on a Document Frequency (DF) score that may indicate a number of documents in the document library 105 may include the keyword candidate. The method may further include scoring the particular keyword candidate based on a Term Frequency Inverse Document Frequency (TFIDF) score, which may be based on the TF score and the DF score. The TFIDF score may indicate the relevance of the particular keyword candidate with respect to the document 104 by indicating how often the particular keyword candidate appears in the document 104 as compared to how many other documents of the document library 105 (e.g., how many of the other documents 108) include the particular keyword candidate. The TF score, the DF score, and the TFIDF score are examples of the relevance scores 112.

In some embodiments, the keyword generator 106 may be configured to select wordlist keywords based on the relevance scores 112 of the keyword candidates. For example, the highest scoring keyword candidate may be selected as a wordlist keyword. Additionally or alternatively, the highest scoring keyword candidates immediately preceding and immediately following the selected wordlist keyword in the wordlist may also be selected as wordlist keywords. In some embodiments, the keyword generator 106 may follow the same process, iteratively selecting wordlist keywords until all the words in the wordlist are part of a wordlist keyword. A further explanation is given below with respect to FIGS. 4 and 6.

In some embodiments, the keyword generator 106 may be configured to select one or more document keywords 150 from the wordlist keywords based on the relevance scores of the wordlist keywords. For example, the keyword generator 106 may be configured to select as document keywords 150 the wordlist keywords with the highest relevance scores compared with the other wordlist keywords. In some embodiments the keyword generator 106 may be configured to select a limited number of document keywords ("document-keyword limit"). For example, the keyword generator 106 may be configured to select the highest scoring document-keyword limit number of wordlist keywords as the document keywords 150. For example, the document-keyword limit might be 3, the keyword generator 106 may then select the 3 highest scoring wordlist keywords from the wordlists as the document keywords 150. The document-keyword limit may be based on one or more of the following: the length of the document 104, the number of words in the document 104, the number of wordlists derived from the document 104, the relevance scores of the wordlist keywords, relevance scores of words in the document 104, etc.

Additionally or alternatively, the keyword generator 106 may be configured to limit the number of document keywords by a threshold relevance score ("document-keyword relevance threshold"). For example the keyword generator 106 may be configured to limit the number of document keywords 150 by only allowing wordlist keywords to become document keywords if the relevance score of the wordlist keywords exceeds the document-keyword relevance threshold. For example, the document-keyword relevance threshold might be 3, the keyword generator 106 may then bar wordlist keywords from becoming document keywords 150 unless they had a relevance score of 3 or higher. The document-keyword relevance threshold may be based on one or more of the following: the relevance scores of wordlist keywords, the relevance scores of words in the document 104 or the relevance scores of words in other documents 108, the mean or standard deviation of relevance scores of words from any source (including words from the document 104), and word lists derived from the document 104 or wordlist keywords from the document 104 or words from other document 108.

In some embodiments, the keyword generator 106 may be configured to generate document keywords 150 as an ordered list. In these or other embodiments, the keyword generator 106 may be configured to order the document keywords 150 based on the relevance score of the document keywords 150.

The keyword generator 106 may include code and routines configured to enable a computing device to perform operations described with respect to the keyword generator 106. Additionally or alternatively, the keyword generator 106 may be implemented using hardware including a processor, a microprocessor (e.g., to perform or control performance of one or more operations), a field-programmable gate array (FPGA), or an application-specific integrated circuit (ASIC). In some other instances, the keyword generator 106 may be implemented using a combination of hardware and software. In the present disclosure, operations described as being performed by the keyword generator 106 may include operations that the keyword generator 106 may direct a corresponding system to perform Modifications, additions, or omissions may be made to FIG. 1 without departing from the scope of the present disclosure. For example, the system 100 may include more or fewer elements than those explicitly illustrated and described.

Figure 2:
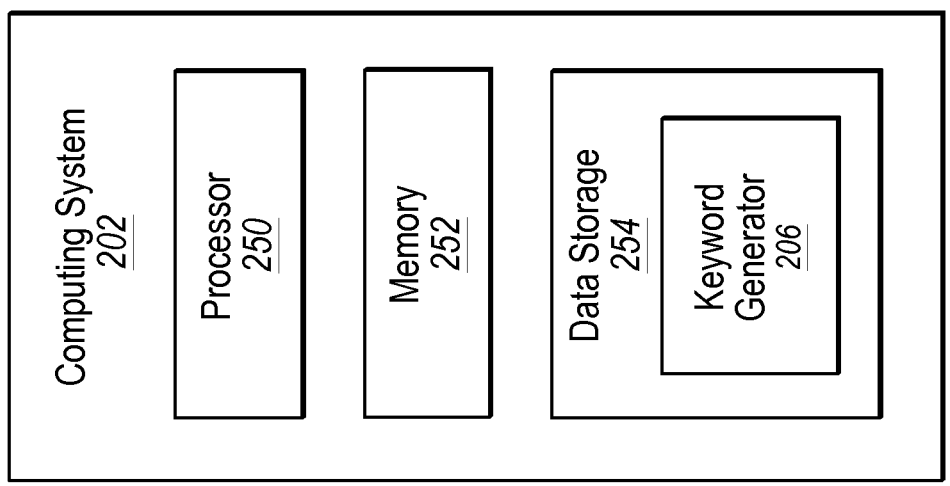
FIG. 2 illustrates an example computing system that may include a keyword generator configured to generate keywords from documents.

FIG. 2 illustrates an example computing system 202 that may include a keyword generator 206, according to at least one embodiment described in the present disclosure. The computing system 202 may be configured to implement one or more operations associated with the keyword generator 206 in some embodiments. The keyword generator 206 may be analogous to the keyword generator 106 described above in some embodiments. The computing system 202 may include a processor 250, a memory 252, and a data storage 254. The processor 250, the memory 252, and the data storage 254 may be communicatively coupled.

In general, the processor 212 may include any suitable special-purpose or general-purpose computer, computing entity, or processing device including various computer hardware or software modules and may be configured to execute instructions stored on any applicable computer-readable storage media. For example, the processor 212 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 212 may include any number of processors configured to individually or collectively perform any number of operations described in the present disclosure. Additionally, one or more of the processors may be present on one or more different computing systems. In some embodiments, the processor 212 may interpret and/or execute program instructions and/or process data stored in the memory 214.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the keyword generator 206 may be included in the data storage 254 as program instructions. The processor 250 may fetch the program instructions of the keyword generator 206 from the data storage 254 and may load the program instructions of the keyword generator 206 in the memory 252. After the program instructions of the keyword generator 206 are loaded into memory 252, the processor 250 may execute the program instructions such that the computing system may implement the operations associated with the keyword generator 206 as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
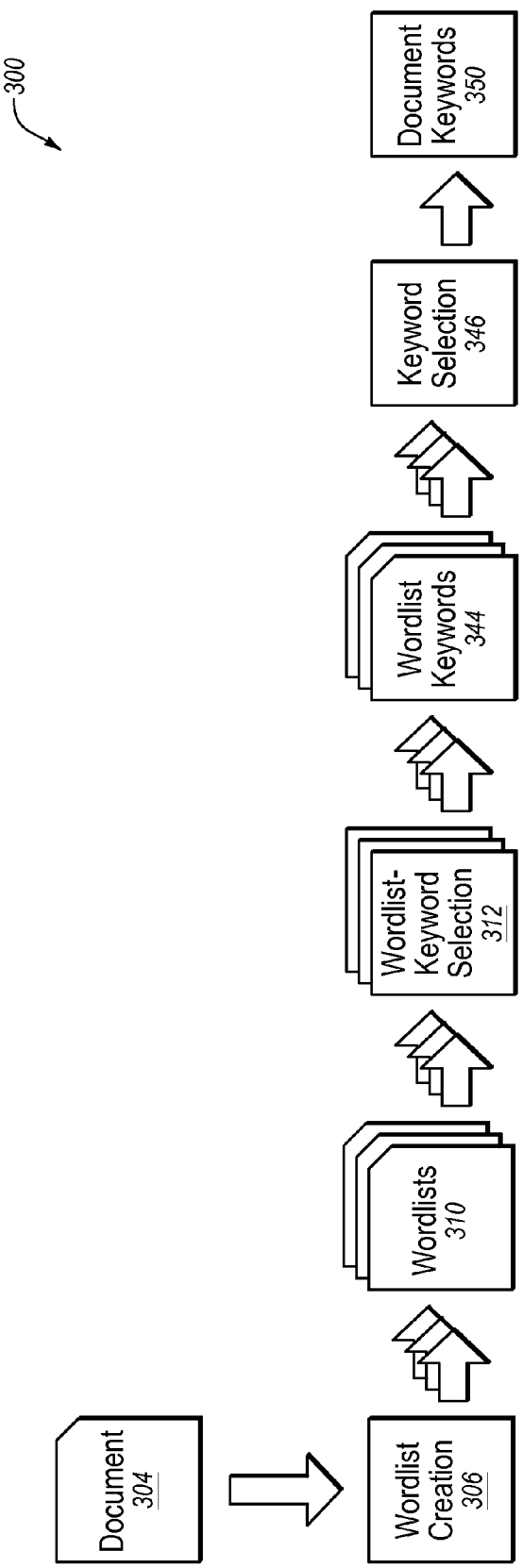
FIG. 3 is a diagram of an example flow that may be used with respect to generating keywords.

FIG. 3 is a diagram of an example flow 300 that may be performed with respect to generating keywords, according to at least one embodiment described in the present disclosure. The flow 300 may be performed by any suitable system, apparatus, or device. For example, a keyword generator such as the keyword generators 106 or 206 described above with respect to FIGS. 1 and 2, respectively, may perform one or more of the operations associated with the flow 300. Although illustrated with discrete blocks and phases, the steps and operations associated with one or more of the blocks or phases of the flow 300 may be divided into additional blocks or phases, combined into fewer blocks or phases or eliminated, depending on the implementation.

The flow 300 may be performed with respect to one or more portions of a document 304, which may be analogous to the document 104 of FIG. 1.

In the illustrated embodiment, the flow 300 may include a wordlist creation block 306 that may correspond to operations associated with selecting words from the document 304.

For example in some embodiments, in the wordlist creation block 306, the keyword generator may be configured to iteratively select words from the document 304 to form one or more wordlists 310. In some embodiments, the wordlists 310 may have a certain length ("wordlist length"). In some embodiments, the keyword generator may be configured to select all the words in the document, a wordlist length at a time to form the wordlists 310. In these or other embodiments, the wordlist length may have a limit ("wordlist length limit") that may limit the length of each wordlist. In some instances, a higher wordlist length limit may yield more accurate keywords, but may also use more processing resources. As such, selection of the wordlist length limit may be based on processing resource use and a target accuracy level.

Additionally or alternatively, the keyword generator may be configured to select the same words for multiple wordlists 310. For example, the keyword generator may be configured to select a first, second, third and fourth word of the document 304 as a first wordlist, and may select the second, third, fourth and fifth words of the document 304, as a second wordlist.

In some embodiments, the keyword generator may be configured to select words from certain portions of the document 304 to for one or more wordlists 310. Additionally or alternatively, the keyword generator may be configured to select words from multiple sections of the document 304 to form one or more wordlists 310.

In some embodiments, the keyword generator may be configured to select adjacent words in the document to configure one or more of the wordlists 310 as ordered wordlists based on the adjacency of the words in the document. Additionally or alternatively, the keyword generator may be configured to select words from a sentence, or phrase, or all the words between punctuation marks to form one or more wordlists 310 such that the corresponding wordlists 310 may be associated with a particular sentence or phrase.

In some embodiments, the keyword generator may be configured to select all the words from a sentence, or part of a sentence, or select them one or more at a time as described above to form one or more wordlists 310. For example the keyword generator may be configured to select all the words of a sentence, or between two punctuation marks as a particular wordlist. Additionally or alternatively, the keyword generator may use punctuation as boundaries not to cross for the creation of a single wordlist. For example, if a sentence were only five words long, and the wordlist length were three, the first wordlist might include the first, second and third word, the second wordlist might include the second, third and fourth word, and the third wordlist might include the third, fourth and fifth word, and those might be the only wordlists created from that document sentence, with further wordlists being derived from further document sentences.

In some embodiments, in the wordlist creation block 306, the keyword generator may be configured to select all the words form a paragraph, or select them one or more at a time as described above to form wordlists 310. For example the keyword generator may be configured to select all the words of a paragraph as a wordlist. Additionally or alternatively, the keyword generator may use paragraph breaks as boundaries not to cross for the creation of a single wordlist.

In some embodiments, in the wordlist creation block 306, the keyword generator may be configured to make selections for the wordlist based on parts of speech. For example, the keyword generator may be configured to select only nouns and verbs to form the wordlist. Additionally or alternatively, the keyword generator may be configured to ignore prepositions and conjunctions when selecting words for the wordlist. Additionally or alternatively, the keyword generator may be configured to ignore words from a list of common words, for example "the". Additionally, the keyword generator may exclude from a wordlist any word already in that wordlist, so that the words in any wordlist are unique to that wordlist.

In some embodiments, in the wordlist creation block 306, the keyword generator may be configured to filter out words in the document 304 when creating the wordlists 310. Additionally or alternatively, the keyword generator may be configured remove words from the wordlists 310 after placing them in the wordlists 310.

In the wordlist creation block 306, the keyword generator may be configured to use multiple conjugations of a word to form wordlists 310. Additionally or alternatively, the keyword generator may be configured to use wildcard characters to include multiple conjugations or similar words in the wordlists 310. For example the keyword generator may be configured to use "beg*n" in the wordlists 310 to represent the words "begin", "began", or "begun". Additionally the keyword generator may be configured to use truncation characters to include multiple forms of words in the wordlists 310. For example keyword generator may be configured to use "public!" in the wordlists 310 to represent the words "public", "publicly", or "publicity".

The wordlists 310 may contain words taken from the document 304 by the keyword generator during the wordlist creation block 306. The wordlists 310 are ordered lists of words. The wordlists 310 may contain ordered groups of words taken in order from the document 304 by the keyword generator. The wordlists 310 may contain words not found in the document 304, for example, words from the title of the document 304, or words relating to the source of the document 304, such as the subject of the publication in which the document 304 was published. The wordlists 310 may contain all the words in the document 304, in separate wordlists. Multiple of the wordlists 310 may include the same words from the document 304.

In the illustrated embodiment, the flow 300 may include a wordlist-keyword selection block 312 that may correspond to operations associated with selecting one or more wordlist keywords 344 from each of the wordlists 310. The wordlist keywords 344 may correspond to keywords selected by the keyword generator at the wordlist-keyword selection block 312. The wordlist keywords 344 may represent relatively important words and groups of words from corresponding wordlists. The wordlist keywords 344 may represent the relatively important words and groups of words from the wordlist as found in the document 304. Additionally or alternatively, the wordlist keywords 344 may represent the relevance of words and groups of words from the wordlist as found in the document 304, relative to the prevalence of those words and groups of words in other documents.

In the wordlist-keyword selection block 312 the keyword generator may be configured to create combinations of words from the wordlist, score the words and combinations and compare them to select the wordlist keywords 344. An example of operations that may be performed with respect to the wordlist-keyword selection block 312 is given below with regard to FIG. 4.

In the illustrated embodiment, the flow 300 may include a keyword selection block 346 that may correspond to operations associated with selection of document keywords 350 from among the wordlist keywords 344.

In the keyword selection 346, block the keyword generator may be configured to select the document keywords 350 based on the relevance scores generated during the wordlist keyword selection block 312. In the keyword selection block 346 the keyword generator may be configured to select the document keywords 350 by selecting from among the wordlist keywords 344.

In some embodiments, the keyword generator may be configured to select a document-keyword limit number of document keywords 350 from the wordlist keywords 344 based on the relevance scores that were generated during the wordlist selection block 312. The document-keyword limit may be based on the length of the document, or a user selection. Additionally or alternatively, in the keyword selection block 346 the keyword generator may be configured to select the document keywords 350 from the wordlist keywords 344 based on their having relevance scores higher than the document-keyword relevance threshold. The document-keyword relevance threshold may be based on a fixed score, or user selection as described above. Additionally or alternatively the document-keyword relevance threshold may be based on the scores of the wordlist keywords 344, or the scores of the keyword candidates. For example the document-keyword relevance threshold may be one standard deviation above the median score of keyword candidates.

Modifications, additions or omissions may be made to the flow 300 without departing from the scope of the present disclosure. For example, the order of one or more of the operations may vary as compared to as described. Further, one or more operations may be added or omitted.

Figure 4:
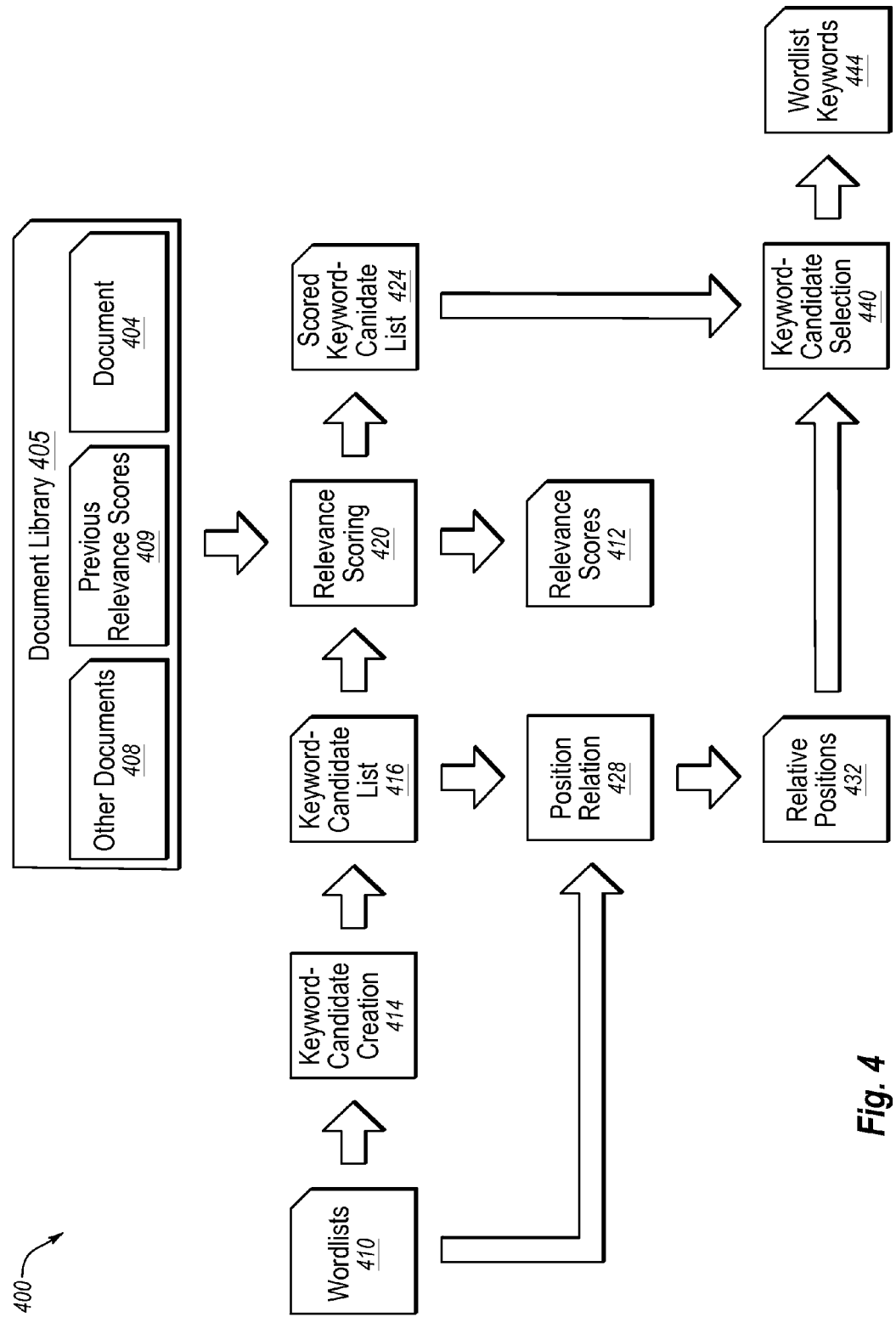
FIG. 4 is a diagram of an example flow that may be used with respect to wordlist keyword selection.

FIG. 4 is a diagram of an example flow 400 that may be used with respect to keyword generation, specifically the selection of wordlist keywords, according to at least one embodiment described in the present disclosure. The flow 400 may be performed by any suitable system, apparatus, or device. For example, a keyword generator such as the keyword generators 106 or 206 described above with respect to FIGS. 1 and 2, respectively, may perform one or more of the operations associated with the flow 400. Although illustrated with discrete blocks and phases, the steps and operations associated with one or more of the blocks or phases of the flow 400 may be divided into additional blocks or phases, combined into fewer blocks or phases or eliminated, depending on the implementation.

Additionally, one or more operations associated with the flow 400 may be performed with respect to the wordlist keyword selection 312 described above with respect to FIG. 3. For example, the flow 400 may be performed with respect to a wordlist 410, which may be analogous to the wordlists 310 of FIG. 3 to generate wordlist keywords 444, which may be analogous to the wordlist keywords 344 of FIG. 3. In some embodiments, the flow 300 of FIG. 3 may use flow 400 to process one or more wordlists 310 to select wordlist keywords 344. In some embodiments the keyword generator may be configured to process each of the wordlists 310 generated in flow 300 by the wordlist creation block 306 to generate wordlist keywords 344 for each of the wordlists 310 by using the flow 400.

In the illustrated embodiment, the flow 400 may include a keyword-candidate creation block 414 that may correspond to operations associated with organizing one or more words from the wordlist 410 into groupings of keyword candidates.

In some embodiments, the wordlist 410 may include an ordered wordlist in which the words in the wordlist 410 may be ordered according to their order of appearance in the document 404. In these or other embodiments, the keyword generator may be configured to create one or more possible ordered combinations of one or more words in the wordlist 410. In some embodiments, the keyword generator may be configured to create all of the possible ordered combinations. Additionally or alternatively, the keyword generator may be configured to create the possible ordered combinations according to adjacency of the words with respect to each other. In these or other embodiments, the number of words in the combinations may be limited by the keyword-length limit. The combinations of words and/or individual words may be included as keyword candidates.

By way of example, if the keyword candidates were limited to a keyword-length limit of three words and the wordlist 410 were an ordered wordlist, the keyword generator may be configured to select the first word of the wordlist 410 as a first keyword candidate. Further, the keyword generator may be configured to select a combination of the first and second words of the wordlist 410 as a second keyword candidate. Additionally, the keyword generator may be configured to select a combination of the first and second and third words of the wordlist 410 as a third keyword candidate. The keyword generator may also be configured to select the second word of the wordlist 410 as a fourth keyword candidate. In addition, the keyword generator may be configured to select a combination of the second and third words of the wordlist 410 as a fifth keyword candidate. Moreover, the keyword generator may be configured to select a combination of the second, third and fourth words of the wordlist 410 as the sixth keyword candidate.

The keyword-candidate list 416 may include the keyword candidates that may have been organized by the keyword generator in the keyword-candidate creation block 414 from the wordlist 410. In some embodiments where the keyword generator may be configured to form all possible combinations of words adjacent in the wordlist 410, each word from the wordlist 410 may appear in multiple keyword candidates in a single keyword-candidate list 416 in some instances. Further, in some embodiments, each word in the wordlist 410 may also appear individually as a keyword candidate in the keyword-candidate list 416.

The process of creating the keyword-candidate list 416 from the wordlist 410 may occur at the time of, or in the process of, creation of the wordlist 410 in some embodiments. These two processes may be related in some embodiments and may be accomplished at or about the same time, or within the same process. Additionally or alternatively, these processes may be performed at different times.

In the illustrated embodiment, the flow 400 may include a position relation block 428 that may correspond to operations associated with relating keyword candidates of the keyword-candidate list 416 to other keyword candidates derived from the wordlist 410. In particular, relative positions 432 of the keyword candidates with respect to each other in the wordlist 410 and/or the document 404 may be determined in the position relation block 428.

The relative positions 432 may include data that represents a relationship in the positions of keyword candidates in the keyword candidate list 416, to other keyword candidates in the keyword candidate list 416 with respect to the position of the words in the wordlist 410 or in the document 404. In some embodiments, (e.g., where the wordlist 410 is ordered according to order of appearance in the document 404) the relative positions 432 may include a list of which keyword candidates immediately precede and immediately follow the keyword candidate in the wordlist 410 and/or in the document 404. Additionally or alternatively the relative positions 432 may include the keyword-candidate list 416 including information about which other keyword candidates in the keyword-candidate list 416 precede and follow each keyword candidate in the wordlist 410 or in the document 404. The relative positions 432 may take any form that associates the keyword candidates of the keyword candidate list 416 with their relative positions in the wordlist 410 or the document 404, such as a list, array, matrix, or linked-list.

In some embodiments, the keyword generator, in the position relation block 428, may be configured to note all keyword candidates 416 that immediately precede and immediately follow each other keyword candidate in the keyword-candidate list 416 with respect to the positions of the words in the wordlist 410. For example the keyword generator may be configured to start with the first keyword candidate in the keyword candidate list 416 and note one or more keyword candidates that immediately precede the first keyword candidate in the wordlist 410. Further, the keyword generator may be configured to note one or more keyword candidates that immediately follow the first keyword candidate in the wordlist 410. In some embodiments, the keyword generator may be configured to do the same for all the keyword candidates in the keyword candidate list 416.

In these or other embodiments, the keyword generator may be configured to compare the positions of keyword candidates with respect to the relative positions of corresponding words in the document 404. In some embodiments the wordlist 410 may retain the order of the words as they were found in the document 404. In other embodiments the order may not be maintained from the document 404 to the wordlist 410; and so during a position relation block 428 the keyword generator may create relative position information with regard to the document 404 or the wordlist 410.

The process of relating the positions of keyword candidates in a wordlist 410 may occur at the time of, or in the process of creating the keyword candidates at the keyword candidate creation block 414. In some embodiments. These two processes may be related in some embodiments and may be accomplished at or about the same time, or within the same process. Additionally or alternatively, these processes may be performed at different times.

In the illustrated embodiment, the flow 400 may include a document library 405 that may include one or more documents. The document library 405 may be analogous to the document library 105 of FIG. 1. The document 404 may be a document in the document library 405 in some embodiments. The document library 405 may also include one or more other documents 408. The other documents 408 may be analogous to the documents 108 of FIG. 1.

In the illustrated embodiment, the flow 400 may include a relevance scoring block 420 that corresponds to operations associated with scoring the relevance of a keyword candidate based on its relevance to a document 404.

In some embodiments, in the relevance scoring block 420, the keyword generator may be configured to generate a relevance score 412 for each of one or more keyword candidates found in the keyword candidate list 416. The relevance scores 412 may be analogous to the relevance scores 112 of FIG. 1.

In some embodiments, the relevance scores 412 may be based on one or more documents in the document library 405 and the frequency of use of those words in those documents. For example, a first particular relevance score may indicate the number of times a particular keyword candidate appears in the document 404—e.g., the first particular relevance score may include a TF score of the particular keyword candidate. Additionally or alternatively, a second particular relevance score may indicate the number of times the particular keyword candidate appears in the other documents 408 of the document library 405—e.g., the second particular relevance score may include a DF score of the particular keyword candidate. In these or other embodiments, a third particular relevance score may indicate how often the particular keyword candidate appears in the document 404 as compared to the other documents 408—e.g., the third particular relevance score may include a TFIDF score of the particular keyword candidate. Additionally or alternatively, the relevance scores 412 may be based on a dictionary or database of words and relevance scores for those words relative to the document library 405. In some embodiments, one or more of the relevance scores 412 may be generated based on the flow 500 described with respect to FIG. 5.

In some embodiments, the document library 405 may include one or more previously generated relevance scores 409 ("previous relevance scores 409"). In some embodiments the keyword generator may be configured to generate one or more relevance scores 412 based on the previous relevance scores 409, as discussed below. The use of the previous relevance scores 409 may improve processing time in the generation of one or more of the relevance scores 412. In these or other embodiments, one or more of the relevance scores 412 may be stored for future use as previous relevance scores 409.

In some embodiments, a scored keyword-candidate list 424 may be generated at the relevance scoring block 420. The scored keyword-candidate list 424 may include the keyword candidates of the keyword candidate list 416 with scores as given in the relevance scoring block 420. The scored keyword-candidate list 424 may take any form that associates the keyword candidates with relevance scores, such as a list, array, matrix, or linked-list.

In the illustrated embodiment, the flow 400 may include a keyword-candidate selection block 440 associated with selecting keyword candidates of the keyword-candidate list 416 as wordlist keywords 444. In the keyword-candidate selection block 440 the keyword generator may be configured to select keyword candidates as wordlist keywords 444 based on the relative positions 432 and the relevance scores of the keyword candidates that may be found in the scored keyword-candidate list 424.

In some embodiments, in the keyword-candidate selection block 440, the keyword generator may be configured to select one or more keyword candidates as wordlist keywords 444 based on the corresponding keyword candidates having the highest relevance score, which may be reflected by the scored-keyword candidate list 424. In some embodiments in the keyword-candidate selection block 440, the keyword generator may be configured to select one or more keyword candidates as wordlist keywords 444 based on the corresponding keyword candidates having a particular position (e.g., immediately preceding or immediately following) in the wordlist 410 or in the document 404 relative to another wordlist keyword 444. In some embodiments, the keyword generator may be configured to determine which keyword candidates may have a particular position based on the relative positions 432.

For example, in some embodiments, the keyword generator may be configured to select as a first wordlist keyword a first keyword candidate from the scored keyword candidate list 424 based on a first relevance score of the first keyword candidate (e.g., based on the first relevance score being the highest among the relevance scores of the keyword candidates). The keyword generator may be configured to evaluate the keyword candidates with relationships to the first wordlist keyword, which may be represented by the relative positions 432, to select further wordlist keywords. For example, the keyword generator may be configured to evaluate one or more keyword candidates that immediately precede the first wordlist keyword in the wordlist 410 to select a second wordlist keyword.

In some embodiments, the keyword generator may be configured to select the second wordlist keyword based on the relevance scores of the keyword candidates, which may be represented in the scored keyword-candidate list 424. In particular, in some embodiments, the keyword generator may be configured to select as the second wordlist keyword, the keyword candidate with the highest relevance score among the keyword candidates that immediately precede the first wordlist keyword.

Additionally or alternatively, the keyword generator may be configured to evaluate the keyword candidates with relationships to the second wordlist keyword, which may be represented by the relative positions 432, to select further wordlist keywords. For example, the keyword generator may be configured to evaluate one or more keyword candidates that immediately precede the second wordlist keyword in the wordlist 410 to select a third wordlist keyword. The keyword generator may be configured to select the third wordlist keyword based on the relevance scores of the keyword candidates, which may be represented in the scored keyword-candidate list 424. In particular, in some embodiments, the keyword generator may be configured to select as the third wordlist keyword 444, the keyword candidate with the highest relevance score among the keyword candidates that immediately precede the second wordlist keyword 444 in the wordlist 410.

In some embodiments, the keyword generator may be configured to repeat the above process to select further wordlist keywords 444. In some embodiments the keyword generator may be configured to repeat this process until there is no word in the wordlist 410 which precedes a selected wordlist keyword 444. Or, the keyword generator may be configured to repeat this process until the wordlist keywords 444 contain the first word in the wordlist 410, either as its own keyword candidate, or as part of a keyword candidate. Additionally or alternatively, the keyword generator may be configured to use this a similar process to select words that follow the first selected wordlist keyword. In some embodiments, the keyword generator may be configured to perform one or more operations of the keyword candidate selection block 440 according to the method 600 described with respect to FIG. 6.

Modifications, additions or omissions may be made to the flow 400 without departing from the scope of the present disclosure. For example, the order of one or more of the operations may vary as compared to as described. Further, one or more operations may be added or omitted.

Figure 5:
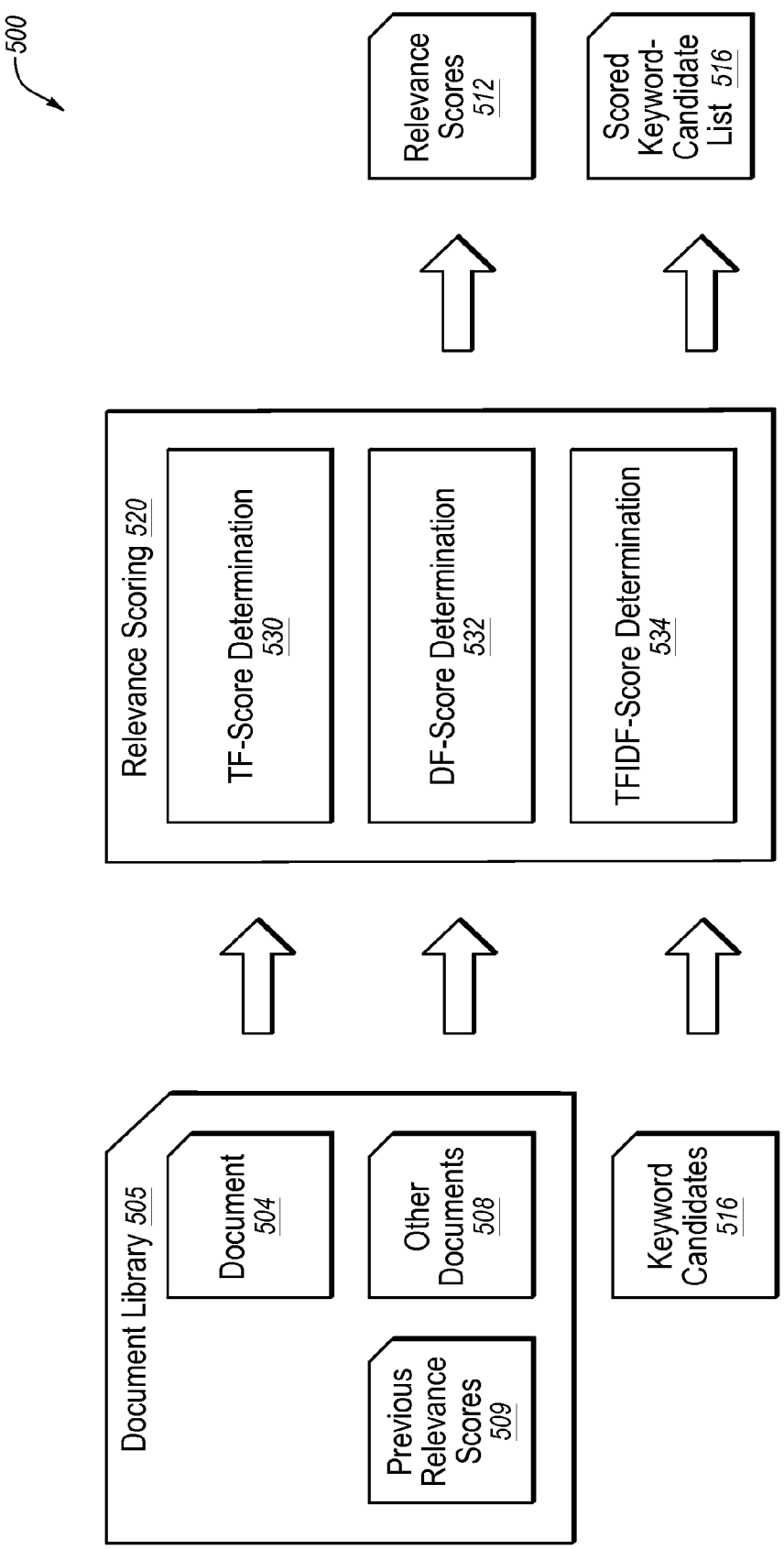
FIG. 5 is a diagram of an example scoring method that may be used with respect to scoring words for keyword generation.

FIG. 5 is a diagram of an example flow 500 that may be used to generate a TFIDF score, according to at least one embodiment described in the present disclosure. The flow 500 may be performed by any suitable system, apparatus, or device. For example, a keyword generator such as the keyword generators 106 or 206 described above with respect to FIGS. 1 and 2, respectively, may perform one or more of the operations associated with the flow 500. Although illustrated with discrete blocks and phases, the steps and operations associated with one or more of the blocks or phases of the flow 500 may be divided into additional blocks or phases, combined into fewer blocks or phases or eliminated, depending on the implementation.

Additionally, one or more operations associated with the flow 500 may be performed with respect to the relevance scoring block 420 of FIG. 4 in some embodiments. For example, the flow 500 may be performed with respect to a document library 505 and a keyword candidate list 516, which may be analogous to the document library 405 and the keyword candidate list 416, respectively, of FIG. 4 to generate relevance scores 512 and a list of scored keyword-candidate list 524, which may be analogous to the relevance scores 412 and scored keyword-candidate list 424, respectively, of FIG. 4.

In the illustrated embodiment, the flow 500 may include a relevance scoring block 520. In the illustrated example, the relevance scoring block 520 may include operations related to determining a TFIDF score of the keyword candidates 516. The relevance scoring block 520 may include a TF-score determination block 530, a DF-score determination block 532, and a TFIDF determination block 534 in some embodiments.

The TF-score determination block 530 may include one or more operations associated with determining a TF score for each of the keyword candidates 516. As indicted above, a TF score of a particular keyword candidate may indicate a frequency of use of the particular keyword candidate in the document 504. In some embodiments, the keyword generator may be configured to determine the TF score for each of the keyword candidates 516 by determining how many times the corresponding keyword candidate occurs in the document 504. In some embodiments, one or more of the TF scores determined in the TF-score determination 530 may be included in the relevance scores 512. Additionally or alternatively, one or more of the TF scores determined in the TF-score determination 530 may be included in the previous relevance scores 509 for future use.

The DF-score determination block 532 may include one or more operations associated with determining a DF score for each of the keyword candidates 516. As indicted above, a DF score of a particular keyword candidate may indicate a number of documents in the document library 505 that may include the particular keyword candidate. In some embodiments, the keyword generator may be configured to determine the DF score for each of the keyword candidates 516 by determining how many of the other documents 508 include the corresponding keyword candidate and by adding that number by one because the document 504 also includes the keyword candidate.

Additionally or alternatively, in some embodiments, the keyword generator may be configured to determine the DF score for one or more of the keyword candidates based on corresponding previous relevance scores 509. For example, the keyword generator may have previously determined a DF score for a particular keyword candidate of the keyword candidates 516 with respect to determining keywords for another document included in the document library 505 and the previously determined DF score may be included in the previous relevance scores 509. Because the document 504 and the other document are both included in the document library 505, the previously determined DF score for the particular keyword may be used for the DF score determination.

In some embodiments, one or more of the DF scores determined in the DF-score determination 532 may be included in the relevance scores 512. Additionally or alternatively, one or more of the DF scores determined in the DF-score determination 532 may be included in the previous relevance scores 509 for future use.

The TFIDF-score determination block 534 may include one or more operations associated with determining a TFIDF score for each of the keyword candidates 516. As indicted above, a TFIDF score of a particular keyword candidate may indicate how often the particular keyword candidate appears in the document 504 as compared to how many other documents of the document library 505 include the particular keyword candidate. In some embodiments, the keyword generator may be configured to determine the TFIDF score for a particular keyword candidate "$w_i$" ("tfidf $(w_i)$") based on the following expression:

$$tfidf(w_i) = \begin{cases} (1 + \log(tf_i))\log\frac{N}{df_i} & \text{if } tf_i \geq 1 \\ 0 & \text{if } tf_i = 0 \end{cases}$$

In the above expression, "$tf_i$" may represent the TF score of the particular keyword candidate "$w_i$", "$df_i$" may represent the DF score of the particular keyword candidate "$w_i$", and "N" may represent the number of documents in the document library 505.

In some embodiments, one or more of the TFIDF scores determined in the TFIDF-score determination 534 may be included in the relevance scores 512. Additionally or alternatively, one or more of the TFIDF scores determined in the TFIDF-score determination 534 may be included in the previous relevance scores 509 for future use.

As indicated above, in some embodiments, one or more relevance scores 512 (e.g., the TFIDF scores) of the keyword candidates of the keyword candidate list 516 may be included with the corresponding keyword candidates to generate the scored keyword candidate list 524.

Modifications, additions or omissions may be made to the flow 500 without departing from the scope of the present disclosure. For example, the particular relevance scores and operations are given as examples and different relevance scores and operations may be used. Additionally, the order of one or more of the operations may vary as compared to as described. Further, one or more operations may be added or omitted.

Figure 6:
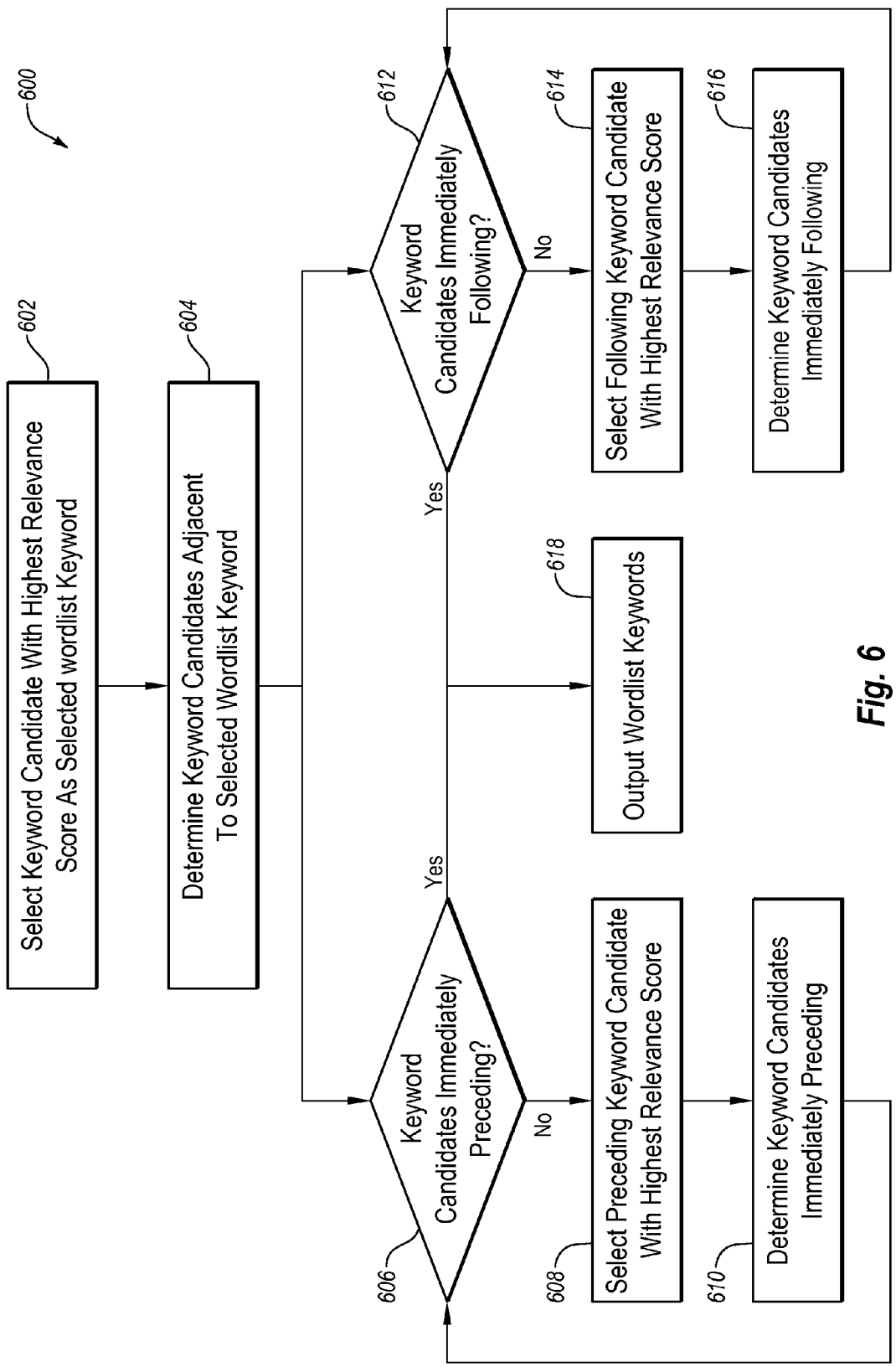
FIG. 6 is a flowchart of an example method of selecting keyword candidates from a wordlist.

FIG. 6 is a flowchart of an example method 600 of selecting one or more keyword candidates as wordlist keywords, according to at least one embodiment described in the present disclosure. The method 600 may be performed by any suitable system, apparatus, or device. For example, a keyword generator such as the keyword generators 106 or 206 described above with respect to FIGS. 1 and 2, respectively, may perform one or more of the operations associated with the method 600. Although illustrated with discrete blocks and phases, the steps and operations associated with one or more of the blocks or phases of the method 600 may be divided into additional blocks or phases, combined into fewer blocks or phases or eliminated, depending on the implementation.

Additionally, one or more operations associated with the method 600 may be performed with respect to the keyword candidate selection block 440 of FIG. 4 in some embodiments. For example, the method 600 may be performed with respect to the scored keyword candidate list 424 and the relative positions 432 of FIG. 4 to determine the wordlist keywords 444 described with respect to FIG. 4.

The method 600 may include a block 602 in which a keyword candidate with a relevance score that indicates a higher degree of relevance as compared to other keyword candidates may be selected as a wordlist keyword ("first selected wordlist keyword"). For example, in some embodiments, a keyword candidate with the highest TFIDF score may be selected as the first selected wordlist keyword. In some embodiments, the selection may be from a scored keyword candidate list, such as from the scored keyword candidate lists 424 and 524 described above.

At block 604, the relative positions of the keyword candidates in the scored candidate-keyword list may be obtained. Additionally or alternatively, based on the relative positions, keyword candidates that may be adjacent to the first selected wordlist keyword may be determined. In these or other embodiments, the determined adjacent keyword candidates may be determined to be either immediately preceding or immediately following the first selected wordlist keyword in the corresponding wordlist or document from which the scored keyword candidates may be obtained.

It may be determined at block 606 whether there are any keyword candidates immediately preceding the first selected word-list keyword. In response to determining that there are no keyword candidates immediately preceding the first selected wordlist keyword, the method 600 may proceed to block 618. In response to determining that there are one or more keyword candidates immediately preceding the first selected wordlist keyword, the method 600 may proceed to block 608.

At block 608, a comparison may be made with respect to the relevance scores of the keyword candidates that may be immediately preceding the first selected wordlist keyword. In some embodiments, based on the comparison, the immediately preceding keyword candidate with the highest relevance score may be selected as another wordlist keyword ("preceding wordlist keyword"). In some instances, there may be only one keyword candidate immediately preceding the most recently selected wordlist keyword. In one or more of these instances, that keyword candidate may be selected as a preceding wordlist keyword.

At block 610, keyword candidates that may be immediately preceding the preceding wordlist keyword selected at block 608 may be determined. In some embodiments, the keyword candidates that may be immediately preceding the preceding wordlist keyword selected at block 608 may be determined from the relative positions.

Following block 610, the method 600 may return to block 606 in which it may be determined whether there are any keyword candidates immediately preceding the preceding wordlist keyword. In some embodiments, the determination at block 606 may be made based on whether or not any keyword candidates immediately preceding the preceding wordlist keyword are determined or identified at block 610.

The operations with respect to blocks 606, 608, and 610 may be repeated with respect to the most recently selected preceding wordlist keyword until there are no more keyword candidates immediately preceding the preceding wordlist keyword that had been most recently selected.

It may be determined at block 612 whether there are any keyword candidates immediately following the first selected wordlist keyword. In response to determining that there are no keyword candidates immediately following the first selected wordlist keyword, the method 600 may proceed to block 618. In response to determining that there are one or more keyword candidates immediately following the first selected wordlist keyword, the method 600 may proceed to block 614.

At block 614, a comparison may be made with respect to the relevance scores of the keyword candidates that may be immediately following the first selected wordlist keyword. In some embodiments, based on the comparison, the immediately following keyword candidate with the highest relevance score may be selected as another wordlist keyword ("following wordlist keyword"). In some instances, there may be only one keyword candidate immediately following the most recently selected wordlist keyword. In one or more of these instances, that keyword candidate may be selected as a following wordlist keyword.

At block 616, keyword candidates that may be immediately following the following wordlist keyword selected at block 614 may be determined. In some embodiments, the keyword candidates that may be immediately following the following wordlist keyword selected at block 614 may be determined from the relative positions.

Following block 614, the method 600 may return to block 612 in which it may be determined whether there are any keyword candidates immediately following the following word-list keyword. In some embodiments, the determination at block 612 may be made based on whether or not any keyword candidates immediately following the following wordlist keyword are determined or identified at block 616.

The operations with respect to blocks 612, 614, and 616 may be repeated with respect to the most recently selected following wordlist keyword until there are no more keyword candidates immediately following the following wordlist keyword that had been most recently selected.

As indicated above, the operations with respect to blocks 606, 608, and 610 and with respect to blocks 612, 614, and 616 may be repeated until no more keyword candidates that may precede or follow the first selected wordlist keyword are remaining for analysis. In response to this occurring, the method 600 may include a block 618 where the determined wordlist keywords may be output.

Modifications, additions or omissions may be made to the method 600 without departing from the scope of the present disclosure. For example, the particular relevance scores and operations are given as examples and different relevance scores and operations may be used. Additionally, the order of one or more of the operations may vary as compared to as described. Further, one or more operations may be added or omitted.

For example, in some embodiments, the operations with respect to blocks 606, 608, and 610 and with respect to blocks 612, 614, and 616 may be performed at the same time or at different times. Further, the particular sequences and order of sequences described are merely examples and are not limiting.

Based on the above description, keywords may be determined for one or more documents to help reflect the subject matter of the document. Below is an example of performance of one or more of the above-described operations with respect to a particular document to determine one or more keywords (e.g., wordlist or document keywords) for the particular document.

For example, the particular document may include the following sentences: "The new public beta program began in January. The program has been a success." Based on the operations described above with respect to the wordlist creation block of FIG. 3, one or more wordlists may be determined from the above example sentences. For example, the wordlists may be limited to a sentence such that wordlists 702 and 704 of FIG. 7A may be generated. Additionally or alternatively, common words such as "the," "or," "it," "and," etc., or prepositions may be omitted from the wordlists. For example, FIG. 7A includes a wordlist 706 that is a modified version of the wordlist 702 in which common words and prepositions have been omitted.

In these or other embodiments, the wordlists may have a wordlist length limit. FIG. 7A includes wordlists 708, 710, and 712 that may be formed from the example sentence "The new public beta program began in January" in which the wordlist length may be limited to four and in which common words and prepositions may be omitted.

Further, as indicated above, in some embodiments wildcards and truncations may be used for the wordlists. For example, wordlists 714, 716, and 718 illustrate modifications of wordlists 708, 710, and 712 in which wildcards and truncations may be used.

As described above with respect to the keyword candidate creation block 414 of FIG. 4, one or more keyword candidates may be created from the wordlists. In some embodiments, the keyword candidates may be limited by a keyword-length limit such as described above. For example, FIG. 7A includes an example table 720 that includes keyword candidates that may be created from the wordlist 710 in which the keyword candidates have a maximum keyword-length limit of four.

Further, as described above with respect to the position relation block 428 of FIG. 4, relative positions may be determined for the keyword candidates with respect to their positions in the corresponding wordlist or document. The positions may be represented any number of ways. For example, FIG. 7B includes an example table 722 that indicates the relative positions of the keyword candidates of the table 720 with respect to their positions in the wordlist 710. In particular, the "ID Preceding" column of the table 722 indicates identifiers of keyword candidates that immediately precede the keyword candidate of the corresponding row. Additionally, the "ID Following" column of the table 722 indicates identifiers of keyword candidates that immediately follow the keyword candidate of the corresponding row.

Figure 7C:
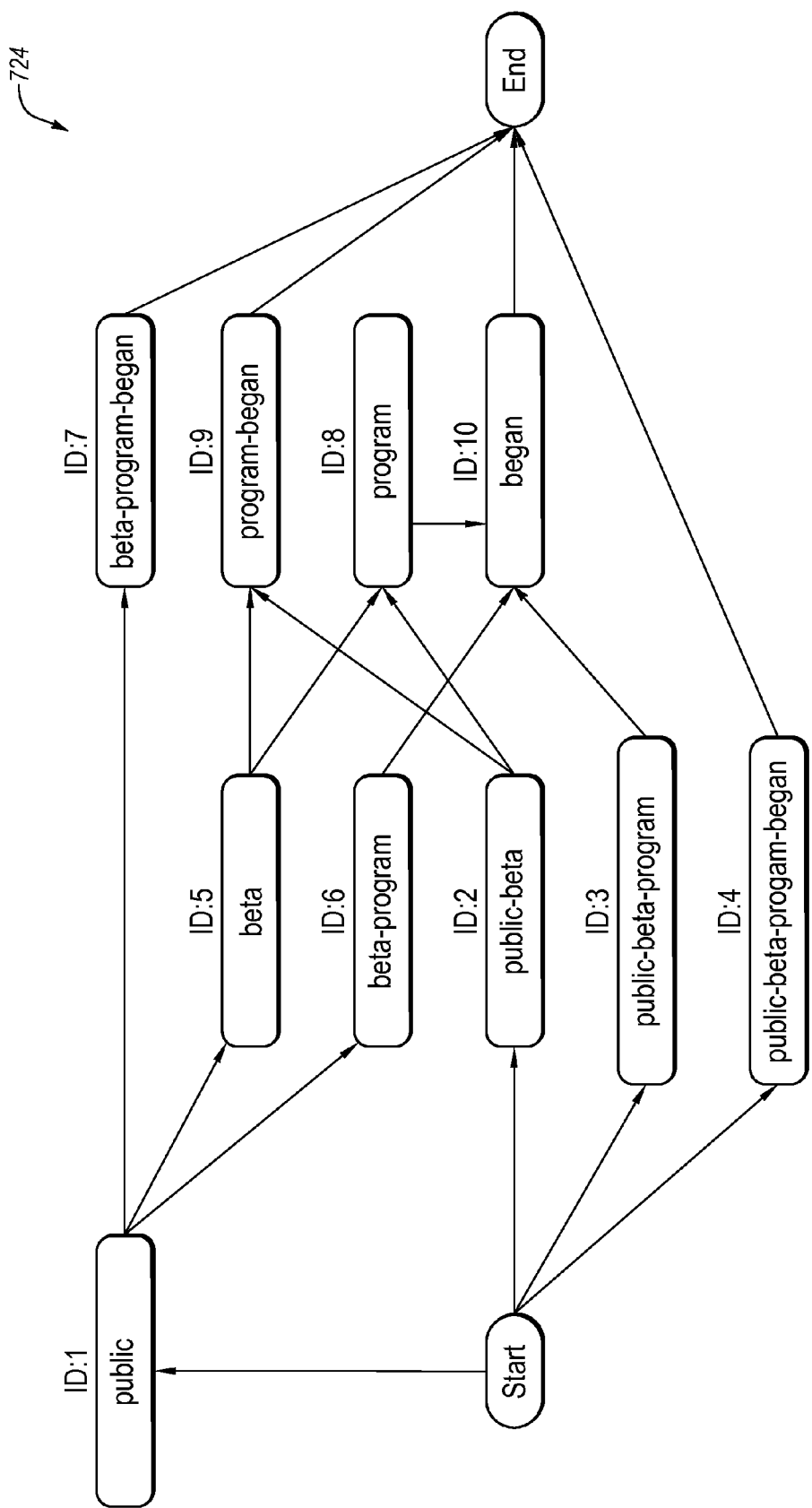
FIG. 7C illustrates a graph that indicates relative positions of keyword candidates.

As another example, FIG. 7C includes an example graph 724 that illustrates a lattice view of the information included in the table 720. In the graph 724, the nodes represent the keyword candidates. Further, the directions of the arrows that connect the nodes represent whether the corresponding nodes precede or follow each other. For example, an arrow pointing from a first node to a second node may indicate that the first node may immediately precede the second node and that the second node may immediately follow the first node.

Additionally or alternatively, relevance scoring may be performed on the keyword candidates of the table 720 to generate a scored keyword-candidate list such as described above with respect to the relevance scoring block 420 and the flow 500 above. FIG. 7D includes a table 726 of an example scored keyword-candidate list with respect to the keyword candidates of the table 720.

Figure 7F:
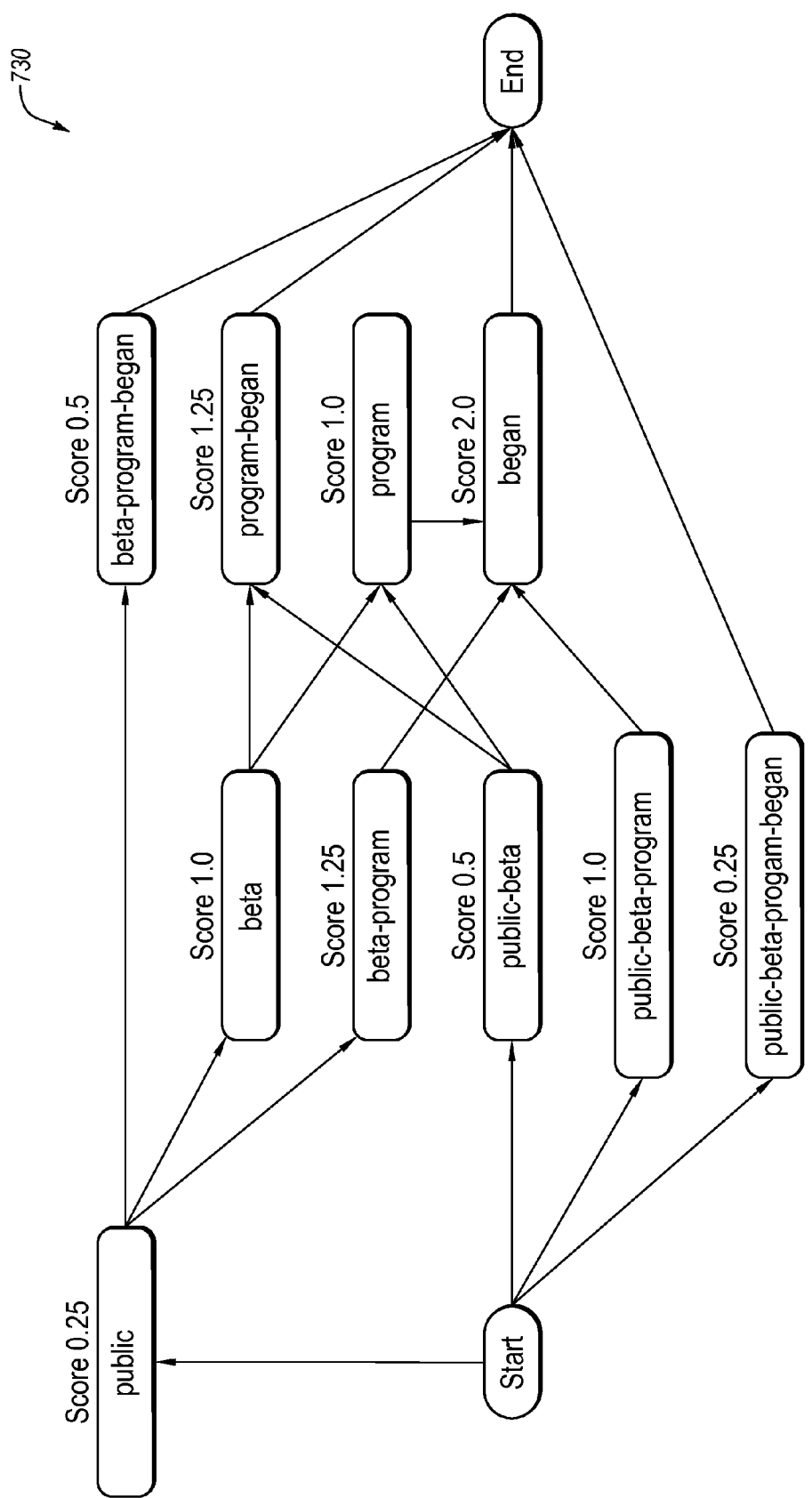
FIG. 7F illustrates a graph that indicates relevant positions of keyword candidates and relevance scores of the keyword candidates.

Further, in some embodiments, one or more wordlist keywords may be selected as described above with respect to block 440 and method 600 described above. An example of performance of such operations is given below with respect to FIGS. 7E and 7F which include a table 728 and a graph 730, respectively. The table 728 and the graph 730 are examples of two different ways to indicate the relative positions of the keyword candidates and their respective relevance scores.

As described above with respect to block 602 of the method 600 of FIG. 6, in the illustrated example of FIGS. 7A-7F, the keyword candidate "began" may be selected as a wordlist keyword for the wordlist 710 based on the keyword candidate "began" having the highest relevance score of "2.0."

As described above with respect to blocks 604 and 606 of the method 600 of FIG. 6, keyword candidates "public-beta-program," "beta-program," and "program" may be identified as keyword candidates that may immediately precede "began" in the wordlist 710 based on position information. The position information that indicates such may be indicated by the "ID Preceding" field of the table 728 that may correspond to the keyword candidate "began." As another example, the keyword candidates "public-beta-program," "beta-program," and "program" may be indicated as immediately preceding "began" in the graph 730 by arrows pointing from corresponding nodes to the node that represents "began."

Further, as described above with respect to blocks 604 and 612 of the method 600 of FIG. 6, it may be determined that there are no keyword candidates in the wordlist 710 of FIG. 7A that immediately follow the keyword candidate "began." For example, the position information that indicates such may be indicated by the "ID Following" field of the table 728 that may correspond to the keyword candidate "began." As another example, in the graph 730, no arrows point from the node that represents "began" to another node that represents another keyword candidate. Based on the determination that there are no keyword candidates that immediately follow "began" operations, 614 and 616 may not be performed with respect to this particular example.

As described above with respect to block 608 of the method 600 of FIG. 6, the keyword candidate "beta-program" may be selected as another wordlist keyword based on its positional relationship of immediately preceding "began" and based on it having a higher relevance score than the other keyword candidates "public-beta-program" and "program" that also immediately precede "began."

As described above with respect to blocks 610 and 606 of the method 600 of FIG. 6, keyword candidate "public" may be identified as a keyword candidate that may immediately precede "beta-program" in the wordlist 710. The selection of "public" may be based on position information and based on "beta-program" being selected as a wordlist keyword according to block 608 of the method 600.

As described above with respect to block 608 of the method 600 of FIG. 6, the keyword candidate "public" may be selected as another wordlist keyword based on it being the only keyword candidate that precedes "beta-program." In the particular example, "public" has the lowest relevance score of "0.25," but may be selected based on its positional relationship of immediately preceding "beta-program" and there being no other keyword candidates immediately preceding "beta-program."

As described above with respect to blocks 610 and 606 of the method 600 of FIG. 6, it may be determined that no keyword candidates precede "public" in the wordlist 710. Further, as indicated above, it may be determined that no keyword candidates follow "began" in the wordlist 710 as indicated above. Therefore, in some embodiments, as described above with respect to blocks 606, 612, and 618, all the wordlist keywords may be determined for the wordlist 710 and they may be output. For example, in the above example, "began," "beta-program," and "public" may be output as wordlist keywords for the wordlist 710.

Similar operations may be performed with respect to the wordlists 702, 704, 706, 708, 712, 714, 716, 718, or any other wordlist that may be generated for the particular document to determine corresponding wordlist keywords. In some embodiments, one or more document keywords may be determined for the particular document from one or more of the wordlist keywords that correspond to the wordlists 702, 704, 706, 708, 710, 712, 714, 716, 718, or any other applicable wordlist, based on one or more operations described with respect to the keyword selection block 346 of flow 300 of FIG. 3.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the block, module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining a wordlist from a digital document;
    creating a keyword candidate list that includes a plurality of keyword candidates, wherein the keyword candidate list is derived from the wordlist in that each keyword candidate includes one or more words included in the wordlist and wherein the keyword candidate list includes a first keyword candidate, a second keyword candidate, and a third keyword candidate;
    noting a first relationship between the first keyword candidate and the second keyword candidate, wherein the first relationship indicates a first relative position in the digital document of the first keyword candidate with respect to the second keyword candidate;
    noting a second relationship between the first keyword candidate and the third keyword candidate, wherein the second relationship indicates a second relative position in the digital document of the first keyword candidate with respect to the third keyword candidate;
    obtaining a first score for the first keyword candidate, wherein the first score is based on a relevance scoring method with respect to content of the digital document;
    obtaining a second score for the second keyword candidate, wherein the second score is based on the relevance scoring method;
    obtaining a third score for the third keyword candidate, wherein the third score is based on the relevance scoring method;
    selecting the first keyword candidate as a first keyword of the digital document based on the first score; and
    selecting the second keyword candidate as a second keyword of the digital document based on the first relationship, the second relationship, the selection of the first keyword candidate as the first keyword of the digital document, and a comparison between the second score and the third score.

2. The method of claim 1, wherein the relevance scoring method is based on a Term Frequency Inverse Document Frequency (TFIDF) scoring method.

3. The method of claim 2, further comprising retaining for future use one or more Document Frequency (DF) scores associated with the TFIDF scoring method.

4. The method of claim 1, wherein selecting the first keyword candidate as the first keyword of the digital document based on the first score is based on a comparison of the first score with respect to one or more other scores of one or more other keyword candidates of the keyword candidate list derived from the wordlist.

5. The method of claim 1, wherein selecting the first keyword candidate as the first keyword of the digital document based on the first score is based on a comparison of the first score with respect to one or more other scores of one or more other keyword candidates derived from one or more other wordlists.

6. The method of claim 1, further comprising limiting a number of keywords for the digital document to a particular number.

7. The method of claim 1, further comprising selecting the first keyword candidate as the first keyword of the digital document based on the first score satisfying a threshold score level.

8. The method of claim 1, further comprising generating an ordered list of keywords of the digital document based on respective scores of the keywords, wherein the ordered list includes the first keyword and the second keyword.

9. The method of claim 1, further comprising performing one or more of the following operations based on the first keyword and the second keyword: finding, organizing, storing, summarizing, and analyzing the digital document.

10. One or more non-transitory computer-readable storage media configured to store instructions that, in response to being executed by one or more processors, cause a system to perform operations, the operations comprising:
    obtaining a wordlist from a digital document;
    creating a keyword candidate list that includes a plurality of keyword candidates, wherein the keyword candidate list is derived from the wordlist in that each keyword candidate includes one or more words included in the wordlist and wherein the keyword candidate list includes a first keyword candidate, a second keyword candidate, and a third keyword candidate;
    noting a first relationship between the first keyword candidate and the second keyword candidate, wherein the first relationship indicates a first relative position in the digital document of the first keyword candidate with respect to the second keyword candidate;
    noting a second relationship between the first keyword candidate and the third keyword candidate, wherein the second relationship indicates a second relative position in the digital document of the first keyword candidate with respect to the third keyword candidate;
    obtaining a first score for the first keyword candidate, wherein the first score is based on a relevance scoring method with respect to content of the digital document;
    obtaining a second score for the second keyword candidate, wherein the second score is based on the relevance scoring method;
    obtaining a third score for the third keyword candidate, wherein the third score is based on the relevance scoring method;
    selecting the first keyword candidate as a first keyword of the digital document based on the first score; and
    selecting the second keyword candidate as a second keyword of the digital document based on the first relationship, the second relationship, the selection of the first keyword candidate as the first keyword of the digital document, and a comparison between the second score and the third score.

11. The computer-readable storage media of claim 10, wherein the operations further comprise limiting a number of words included in each of the keyword candidates to a particular number.

12. The computer-readable storage media of claim 10, wherein the relevance scoring method is based on a Term Frequency Inverse Document Frequency (TFIDF) scoring method.

13. The computer-readable storage media of claim 12, wherein the operations further comprise retaining for future use one or more Document Frequency (DF) scores associated with the TFIDF scoring method.

14. The computer-readable storage media of claim 10, wherein selecting the first keyword candidate as the first keyword of the digital document based on the first score is based on a comparison of the first score with respect to one or more other scores of one or more other keyword candidates of the keyword candidate list derived from the wordlist.

15. The computer-readable storage media of claim 10, wherein selecting the first keyword candidate as the first keyword of the digital document based on the first score is based on a comparison of the first score with respect to one or more other scores of one or more other keyword candidates derived from one or more other wordlists.

16. The computer-readable storage media of claim 10, wherein the operations further comprise limiting a number of keywords for the digital document to a particular number.

17. The computer-readable storage media of claim 10, wherein the operations further comprise selecting the first keyword candidate as the first keyword of the digital document based on the first score satisfying a threshold score level.

18. The computer-readable storage media of claim 10, wherein the operations further comprise generating an ordered list of keywords of the digital document based on respective scores of the keywords, the ordered list including the first keyword and the second keyword.

19. A system comprising:
one or more processors configured to execute instructions;
one or more computer-readable storage media communicatively coupled to the one or more processors and configured to store instructions that, in response to being executed by the one or more processors, cause the system to perform operations, the operations comprising:
obtaining a wordlist from a digital document;
creating a keyword candidate list that includes a plurality of keyword candidates, wherein the keyword candidate list is derived from the wordlist in that each keyword candidate includes one or more words included in the wordlist and wherein the keyword candidate list includes a first keyword candidate, a second keyword candidate, and a third keyword candidate;
noting a first relationship between the first keyword candidate and the second keyword candidate, wherein the first relationship indicates a first relative position in the digital document of the first keyword candidate with respect to the second keyword candidate;
noting a second relationship between the first keyword candidate and the third keyword candidate, wherein the second relationship indicates a second relative position in the digital document of the first keyword candidate with respect to the third keyword candidate;
obtaining a first score for the first keyword candidate, based on a Term Frequency Inverse Document Frequency (TFIDF) scoring method;
obtaining a second score for the second keyword candidate based on the TFIDF scoring method;
obtaining a third score for the third keyword candidate based on the TFIDF scoring method;
selecting the first keyword candidate as a first keyword of the digital document based on a comparison of the first score with respect to one or more other scores of one or more other keyword candidates of the keyword candidate list derived from the wordlist and based on a comparison of the first score with respect to one or more other scores of one or more other keyword candidates derived from one or more other wordlists; and
selecting the second keyword candidate as a second keyword of the digital document based on the first relationship, the second relationship, the selection of the first keyword candidate as the first keyword of the digital document, and a comparison between the second score and the third score.

20. The system of claim 19, wherein the operations further comprise selecting the first keyword candidate and the second keyword candidate as the first keyword and the second keyword, respectively, of the digital document based on the first score and the second score satisfying a threshold score level.

* * * * *